Patented Nov. 14, 1939

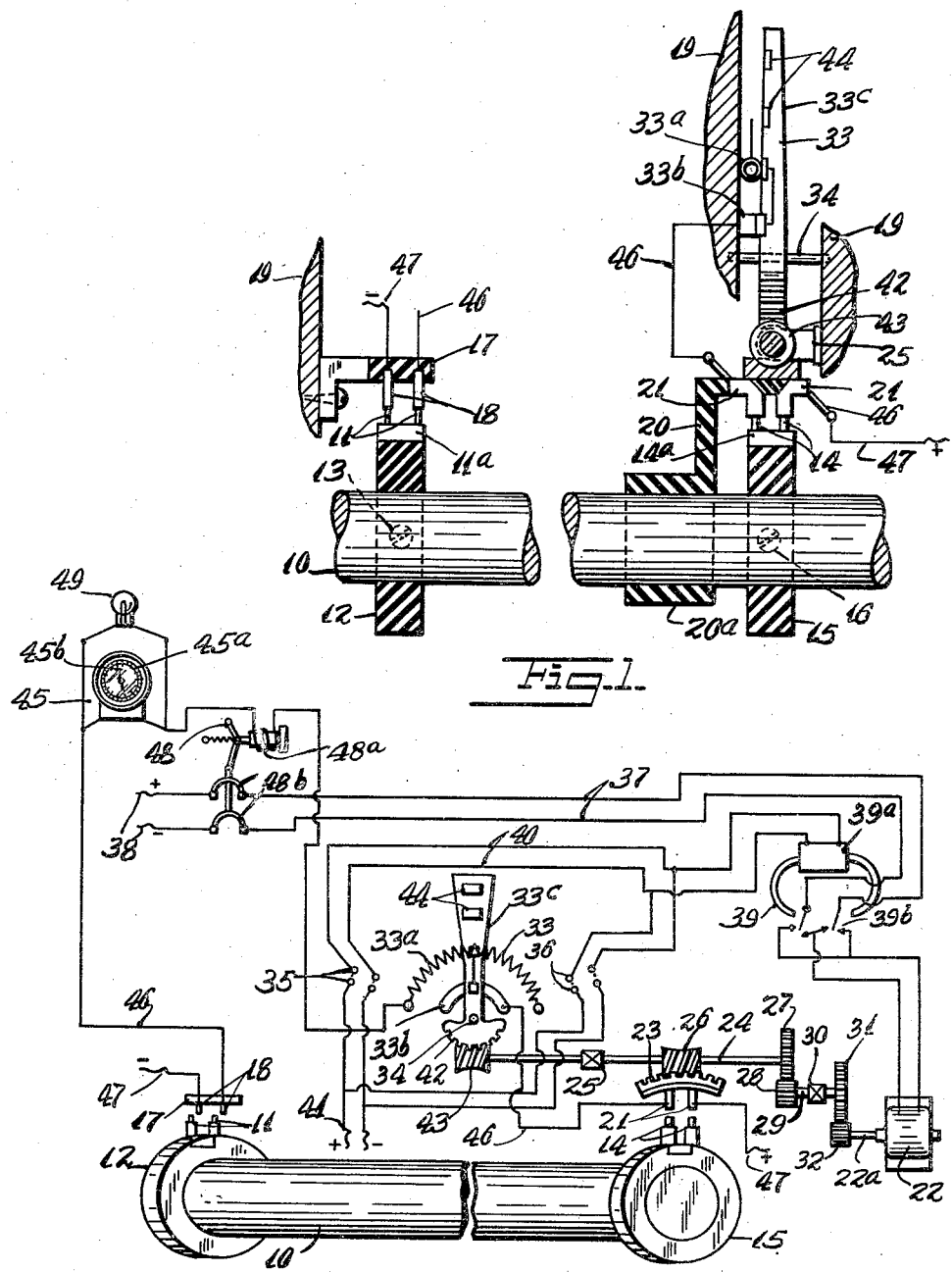

2,180,169

UNITED STATES PATENT OFFICE 2,180,169

ELECTRIC POWER INDICATOR

William Ryan, New York, N. Y.

Application March 1, 1939, Serial No. 259,302

8 Claims. (Cl. 265—26)

This invention relates to new and useful improvements in an electric power indicator.

The invention has for an object the construction of an electric power indicator characterized by the provision of a means for electrically indicating the horse-power of a driven shaft transmitting a load.

Still further the invention proposes the provision of separate pairs of spaced contacts mounted upon a rotative shaft in a manner to complete a circuit upon each revolution of said shaft when there is no strain upon said shaft.

Still further the invention proposes the provision of a means whereby one pair of said contacts will be out of alignment when there is a torque in said shaft due to a change in horsepower in a manner to cause said device to operate to again align said contacts and register the change in horse-power.

Another object of the invention is the provision of a circuit including said contacts, a rheostat, and a horse-power electric meter for registering the changes in horse-power caused by the change in the load being transmitted by said shaft.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a fragmentary vertical sectional view of an electric power indicator constructed according to this invention.

Fig. 2 is a schematic wiring diagram of the device.

The electric power indicator, according to this invention, is to be used in combination with a shaft 10 transmitting a load. The shaft is rotatively supported and is adapted to be driven from one end for operating the load applied to the other end. A fore pair of axially aligned and spaced contacts 11 are mounted upon one portion of the shaft 10. A collar 12 of insulation material is mounted upon the shaft 10 and carries the fore pair of contacts 11. The contacts 11 are mounted upon a plate 11ª, in turn mounted upon a peripheral portion of the collar 12. The collar 12 is rotative upon the shaft 10 and is held in position by means of a set screw 13.

An aft pair of axially aligned and spaced contacts 14 are also mounted upon the shaft 10 at a spaced position with relation to the contacts 11. A collar 15 is mounted upon the shaft 10 and carries the aft pair of contacts 14. The aft pair of contacts are mounted upon a plate 14ª, in turn mounted upon a peripheral portion of the collar 15. The collar 15 is also rotative upon the shaft 10 and is held in position by means of a set screw 16.

The collars 12 and 15 are rotative upon the shaft 10 for the purpose of permitting the pairs of contacts 11 and 14 to be rotated about the shaft 10 and to cause the contacts to be arranged in alignment with relation to each other, that is one behind the other. A stationary member 17 with a pair of complementary fore contacts 18 is adapted to be engaged by the fore pair of contacts 11 at one point during each complete revolution of the shaft 10. The stationary member 17 is constructed of insulation material and is fixedly mounted on the frame 19 of the device and is adapted to hold the complementary pair of fore contacts 18 at a fixed position with relation to the path through which the fore pair of contacts 11 pass when the shaft 10 is rotating.

A moveable member 20 with a pair of complementary aft contacts 21 is mounted upon the shaft 10 in a manner to hold the aft pair of contacts 21 in a position in which they may be engaged by the aft contacts 14 at one point during each revolution of the shaft 10. The movable member 20 is formed of insulation material and is provided with a hub 20ª engaged upon the shaft 10 for permitting the moveable member 20 to be moved through an arcuate path about the collar 15. A means is provided for moving the moveable member to various forward and rearward angular positions and includes an electric motor operator 22. This means includes a segmental gear 23 mounted upon a portion of the movable member 20 opposed to the aft pair of complementary contacts 21. A shaft 24 is rotatively supported in a bearing 25 and carries a worm 26 which meshes with the segmental gear 23. A gear 27 is mounted on one end of the shaft 24. The gear 27 meshes with a small pinion 28 mounted upon a shaft 29. The shaft 29 is rotatively supported in a bearing 30. The other end of the shaft 29 carries a large gear 31 which meshes with a small pinion 32 mounted upon the driven shaft 22ª of the electric motor 22. When current is supplied to the electric motor 22 the rotations thereof will be transmitted to the shaft 24 by means of the train of gears to rotate the worm 26 and cause the movable member 20 to move in an arcuate path about the collar 15.

A rheostat 33 is connected to operate with the latter-mentioned means. This rheostat comprises a resistance 33ᵃ, a ground contact 33ᵇ and a rheostat arm 33ᶜ. The rheostat arm 33ᶜ is pivotally supported upon a pin 34 and the ground 33ᵇ and the resistance 33ᵃ are arranged in an arcuate path about the pivot 34 and are spaced from each other as shown in Fig. 2.

Pairs of spaced contacts 35 are mounted upon the device adjacent the low end of the resistance 33ᵃ and pairs of spaced contacts 36 are mounted on the device adjacent the high end of the resistance 33ᵃ. A circuit 37 including a source of power and the electric motor 22 is provided for causing the electric motor 22 to operate.

A means is provided for changing the direction of rotation of the motor 22 to cause the movable member to swing in a path about the collar 15. This means includes a polarized relay 39 consisting of a coil 39ᵃ and pairs of switches 39ᵇ. The pairs of switches 39ᵇ are mounted in the circuit 37 which includes the source of power 38 and the motor 22. A second circuit 40 including a source of power 41, the pairs of contacts 35, the coil 39ᵃ of the polarized relay and the pairs of contacts 36, are provided for changing the position of the pairs of switches 39ᵇ to reverse the motor 22. The arm 33ᶜ of the rheostat 33 is provided with a segment 42. A worm gear 43 is mounted upon the free end of the shaft 24 and meshes with the segment 42 for swinging the rheostat arm 33ᶜ in one direction or the other to increase or decrease the resistance. The outer end of the rheostat arm 33ᶜ is provided with a pair of contacts 44 which are adapted to contact the pairs of contacts 35 or the pairs of contacts 36.

Current passing from the source of power 38 will pass through the circuit 37, the switches 39ᵇ of the polarized relay 39 to the motor 22 for rotating the shaft 24 to cause the rotative member 20 to move in one direction and the rheostat arm 33ᶜ to similarly move in one direction. When the shaft 24 has rotated the rheostat arm 44 to one end of the resistance 33ᵃ to close either the pairs of contacts 35 or the pairs of contacts 36, current will flow from the source of power 41 through the circuit 40 to energize the coil 39ᵃ of the polarized relay to act on the switches 39ᵇ thereof. This action of the coil 39ᵃ will cause the switches 39ᵇ to pivot and change the flow of current through the motor 22 to reverse the direction of its rotation and cause the member 20 and the rheostat arm 33ᶜ to move in the opposite direction until the aft pair of complementary contacts 24 meet the aft pair of contacts 14.

A horse-power electric meter 45 is provided for connection in a circuit including the resistance 33ᵃ and the ground 33ᵇ of the rheostat 33 to indicate the torque in the shaft. A source of power 47, the contacts 11, 14, 18 and 21, the rheostat 33 and the meter 45 are all connected together in series by a circuit 46 so that when there is no load on the shaft, at the instant the contacts engage each other the meter will indicate zero horse-power.

A retarded relay 48 including a coil 48ᵃ mounted in the circuit 46 and a pair of switches 48ᵇ mounted in the circuit 37 which supplies current to the electric motor 22. The retarded relay acts to stop the motor when current flows through the meter and to cause the motor to operate to permit the means for moving the movable member to find the circuit through the meter when there is a torque displacement in the shaft. When the load on the shaft 10 causes a wrenching thereof to disalign the fore and aft pairs of contacts, no current will pass through the circuit 46 if these pairs of contacts do not complete the circuit at the same instant. This causes the coil 48ᵃ of the circuit breaker to remain idle permitting the switches 48ᵇ to move to a position in which the circuit 37 will be complete for supplying current to the motor 22 to revolve the shaft 24 and cause the rheostat arm 33ᶜ and the movable member 20 to be rotated.

The shaft 24 will rotate in one direction until the contacts 44 of the rheostat arm 33ᶜ close either pair of the pairs of contacts 35 and 36. When this happens the coil 39ᵃ of the polarized relay will be energized to act on the switches 39ᵇ thereof to reverse the flow of current through the motor 22 and cause the motor to operate in the other direction to return the arm 33ᶜ and the movable member 20 until the aft pair of contacts strike the aft pair of complementary contacts 21 at the same time as the fore pair of contacts 11 are striking the fore pair of complementary contacts 18 to complete the circuit 46 through the electric meter 45 which will register the horse-power upon the shaft 10 as indicated by the current passing through the resistance 33ᵃ of the rheostat 33. The current passing through the circuit 46 will energize the coil 48ᵃ of the retarded relay 48 to open the switches 48ᵇ and stop the current from passing through the circuit 37 to stop the motor 22.

The horse-power electric meter 45 is provided with a scale 45ᵃ across which a pointer 45ᵇ operates for indicating the said horse-power. The scale 45ᵃ is calibrated to give horse-power indications at certain speeds of the shaft 10. The horse-power electric meter 45 is provided with an electric lamp 49 connected there-across in a manner to be illuminated when current is passing therethrough to indicate that the circuit 46 is complete and that the meter is indicating the horse-power.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, switches associated with the rheostat and controlling a circuit including said polarized relay for reversing said motor each time the rheostat reaches one extreme of its operation, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft.

2. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, switches associated with the rheostat and controlling a circuit including said polarized relay for reversing said motor each time the rheostat reaches one extreme of its operation, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft, said movable member being angularly adjustable coaxially about said shaft to permit said aft pair of complementary contacts to be properly adjusted to compensate for the torque on said shaft to permit said circuit to be completed when such a torque is present.

3. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, switches associated with the rheostat and controlling a circuit including said polarized relay for reversing said motor each time the rheostat reaches one extreme of its operation, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft, said means comprising a segment formed on said movable member, a worm meshing with said segment, a shaft, and a train of gears connecting said shaft with the driven shaft of said electric motor operator.

4. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, switches associated with the rheostat and controlling a circuit including said polarized relay for reversing said motor each time the rheostat reaches one extreme of its operation, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft, said means comprising a segment formed on said movable member, a worm meshing with said segment, a shaft, and a train of gears connecting said shaft with the driven shaft of said electric motor operator, said rheostat comprising a resistance, a ground connection, a pivotally mounted arm movable across said resistance and said ground, and a means for moving said arm in accordance with the movement of said movable member.

5. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, switches associated with the rheostat and controlling a circuit including said polarized relay for reversing said motor each time the rheostat reaches one extreme of its operation, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft, said means comprising a segment formed on said movable member, a worm meshing with said segment, a shaft, and a train of gears connecting said shaft with the driven shaft of said electric motor operator, said rheostat comprising a resistance, a ground connection, a pivotally mounted arm movable across said resistance and said ground, and a means for moving said arm in accordance with the movement of said movable member, said means comprising a segment formed on said rheostat arm and a worm mounted on said shaft and meshing with said segment.

6. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft, said means comprising a segment formed on said movable member, a worm meshing with said segment, a shaft, and a train of gears connecting said shaft with the driven shaft of said electric motor operator, said rheostat comprising a resistance, a ground connection, a pivotally mounted arm movable across said resistance and said ground, and a means for moving said arm in accordance with the movement of said movable member, said rheostat arm also being provided with a means for reversing the flow of current through said polarized relay to reverse the direction of rotation of said motor each time said rheostat reaches one extreme of its operation.

7. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a retarded relay in said latter circuit and controlling the circuit of said motor for stopping the motor when current flows through said meter and causing the motor to operate to let the means for moving the movable member find the circuit through said meter when there is a torque displacement in said shaft, said means comprising a segment formed on said movable member, a worm meshing with said segment, a shaft, and a train of gears connecting said shaft with the driven shaft of said electric motor operator, said rheostat comprising a resistance, a ground connection, a pivotally mounted arm movable across said resistance and said ground, and a means for moving said arm in accordance with the movement of said movable member, said rheostat arm also being provided with a means for reversing the flow of current through said motor to reverse its direction of rotation each time said rheostat reaches one extreme of its operation, said means comprising a circuit including a polarized relay.

8. In combination with a rotative shaft transmitting a load, a fore pair of axially aligned and spaced contacts mounted thereon, an aft pair of axially aligned and spaced contacts mounted thereon, a stationary member with a pair of complementary fore contacts engaging with said fore contacts at one point during each revolution of said shaft, a movable member with a pair of complementary aft contacts engaging with said aft contacts at one point during each revolution of said shaft, means for moving said movable member to various forward and rearward angular positions and including an electric motor operator, a rheostat connected to operate with said latter means, a polarized relay for controlling the direction of rotation of said motor, switches associated with the rheostat and controlling a circuit including said polarized relay for reversing said motor each time the rheostat reaches one extreme of its operation, a horse-power electric meter for connection in a circuit including said rheostat to indicate horse-power in accordance with the current flowing through the rheostat, a circuit connecting said contacts, said rheostat and said meter in series when there is no load on said shaft at the instant said contacts engage each other, and a delayed action circuit breaker in said latter circuit and controlling the circuit of said motor for stopping the motor when current flows through said meter and causing the motor to operate to let the means for moving the movable member find the circuit through said meter when there is a torque displacement in said shaft, said horse-power electric meter being provided with a lamp which is adapted to be illuminated when current is passing through said circuit to indicate that said meter is registering the horse-power.

WILLIAM RYAN.